(12) United States Patent
Russell (10) Patent No.: US 11,106,225 B2
(45) Date of Patent: Aug. 31, 2021

(54) UNMANNED AERIAL VEHICLES

(71) Applicant: Iain Matthew Russell, London (GB)

(72) Inventor: Iain Matthew Russell, London (GB)

( * ) Notice: Subject to any disclaimer, the term of this patent is extended or adjusted under 35 U.S.C. 154(b) by 230 days.

(21) Appl. No.: 16/112,805

(22) Filed: Aug. 27, 2018

(65) Prior Publication Data

US 2019/0072986 A1 Mar. 7, 2019

(30) Foreign Application Priority Data

Sep. 1, 2017 (GB) .................................... 1714065
Feb. 8, 2018 (GB) .................................... 1802091

(51) Int. Cl.
*G05D 1/12* (2006.01)
*B64C 39/02* (2006.01)
*G05D 1/00* (2006.01)
*G06K 9/00* (2006.01)

(52) U.S. Cl.
CPC .............. *G05D 1/12* (2013.01); *B64C 39/024* (2013.01); *G05D 1/0033* (2013.01); *G05D 1/0088* (2013.01); *G05D 1/0094* (2013.01); *G06K 9/0061* (2013.01); *G06K 9/0063* (2013.01); *B64C 2201/125* (2013.01); *B64C 2201/127* (2013.01); *B64C 2201/141* (2013.01); *B64C 2201/146* (2013.01)

(58) Field of Classification Search
CPC ...... G05D 1/12; G05D 1/0033; G05D 1/0088; G05D 1/0094; G06K 9/0061; G06K 9/0063; B64C 2201/12; B64C 2201/125; B64C 2201/126; B64C 2201/127; B64C 2201/14; B64C 2201/141; B64C 2201/146; B64C 39/024
See application file for complete search history.

(56) References Cited

U.S. PATENT DOCUMENTS

| | | | |
|---|---|---|---|
| 9,044,543 B2* | 6/2015 | Levien | G05D 1/00 |
| 9,588,516 B1* | 3/2017 | Gurel | G06T 5/002 |
| 9,609,288 B1* | 3/2017 | Richman | G05D 1/0044 |
| 10,397,495 B1* | 8/2019 | Graber | B64D 47/08 |
| 2016/0078759 A1 | 3/2016 | Nerayoff et al. | |
| 2016/0376604 A1* | 12/2016 | McCarty, II | C12N 15/8205 800/294 |
| 2017/0229022 A1 | 8/2017 | Gurel et al. | |
| 2018/0082682 A1* | 3/2018 | Erickson | B64C 39/024 |

FOREIGN PATENT DOCUMENTS

| | | |
|---|---|---|
| CN | 106976561 A | 7/2017 |
| WO | 2017030243 A1 | 2/2017 |
| WO | 2017035590 A1 | 3/2017 |
| WO | 2017139282 A1 | 8/2017 |
| WO | 2017147142 A1 | 8/2017 |

* cited by examiner

*Primary Examiner* — William V Gilbert (57) ABSTRACT

A UAV comprises a camera and a controller. The controller is configured to: (a) receive image data from the camera, (b) determine, based on the received image data, whether or not a predetermined visibility condition associated with an operator of the UAV is satisfied, and (c) perform a predetermined action to attempt to operate in accordance with a predetermined visibility state with respect to the operator of the UAV based on a result of the determination.

10 Claims, 5 Drawing Sheets

UNMANNED AERIAL VEHICLES

CROSS-REFERENCE TO RELATED APPLICATIONS

This application claims priority under 35 U.S.C. § 119(a) to UK Patent Application Nos. GB1714065.8, filed on Sep. 1, 2017 and GB1802091.7 filed on Feb. 8, 2018. The entire content of each of these patent applications is hereby incorporated by reference.

FIELD

This disclosure relates to unmanned aerial vehicles (UAVs).

BACKGROUND

A UAV, which may be known as a 'drone' or an 'unmanned aircraft system (UAS)', is an aircraft that does not have a human pilot aboard. With the proliferation of UAVs comes various considerations. One such consideration is the risk of a UAV colliding with another object. Examples of such other objects include, but are not limited to, people, aircraft, animals, trees, buildings etc.

BRIEF DESCRIPTION OF FIGURES

Various features will now be described, by way of example only, with reference to the accompanying drawings in which.

DETAILED DESCRIPTION

As explained above, with the proliferation of UAVs comes the risk of a UAV colliding with another UAV and/or another type of object. Some UAVs include a collision-avoidance mechanism, which relies on the UAV sensing a potential collision and taking remedial action, for example without real-time input from a human. By avoiding a potential collision, damage to the UAV and/or the other object may be avoided.

Some regulatory bodies may recommend or require that an operator of a UAV can always see the UAV during flight so that the operator can take precautions and/or actions to avoid collisions. This may be the case where the operator actively and directly controls the UAV, for example in real-time.

In accordance with examples described herein, the UAV itself determines whether or not a predetermined visibility condition associated with the operator of the UAV is satisfied. For example, the UAV may determine whether or not a visual line of sight exists with respect to the operator. The UAV may perform a predetermined action to attempt to operate in accordance with a predetermined visibility state with respect to the operator of the UAV based on a result of the determination. For example, if it is determined that the predetermined visibility condition is satisfied (for example if the visual line of sight exists with respect to the operator), the UAV can attempt to maintain the predetermined visibility state (for example the existence of the visual line of sight with respect to the operator). If, for example, it is determined that the predetermined visibility condition is not satisfied (for example if the visual line of sight does not exist with respect to the operator), the UAV can attempt to change a current visibility state to the predetermined visibility state (for example the existence of the visual line of sight with respect to the operator).

Figure 1:
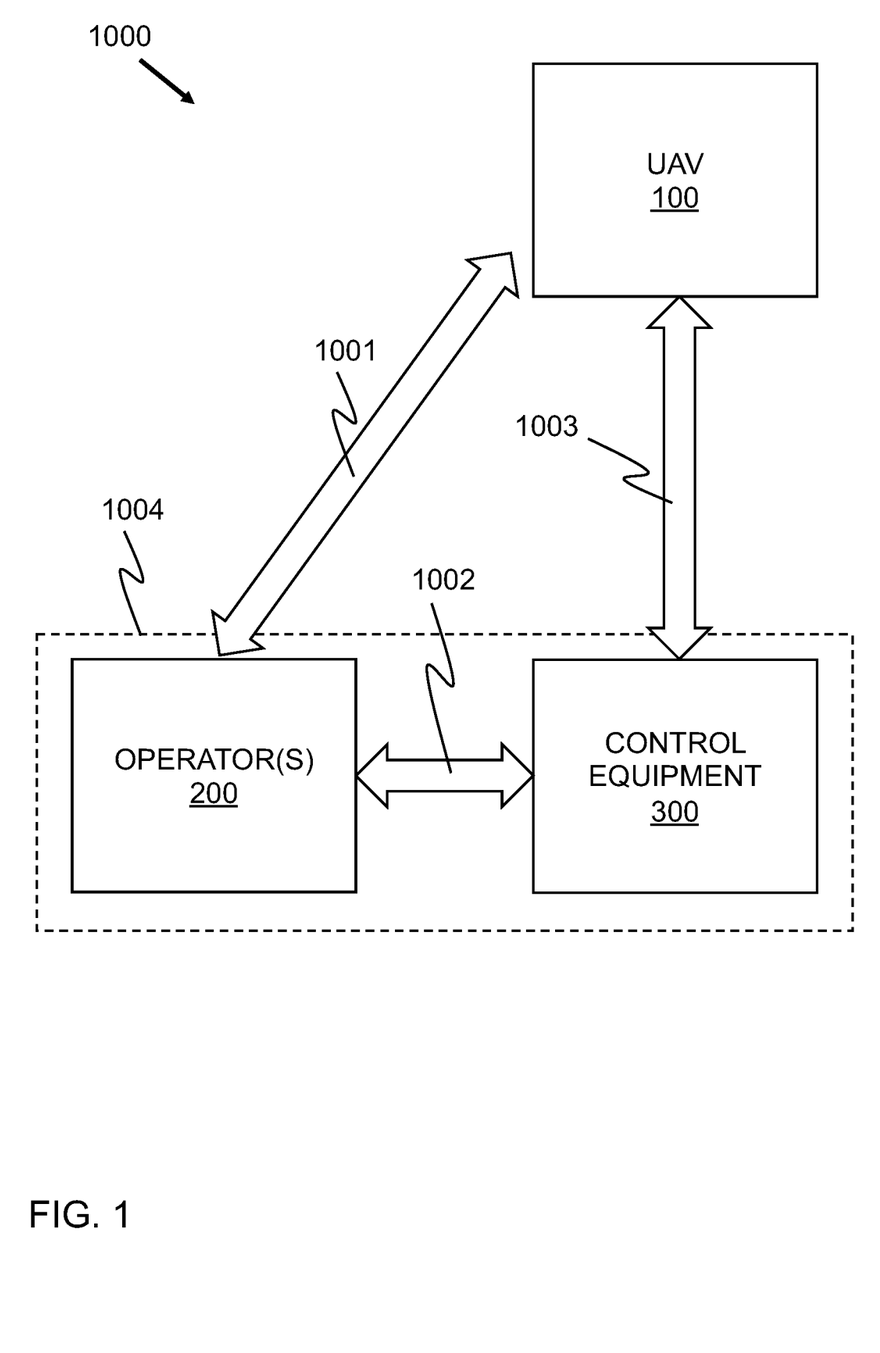
FIG. 1 shows a block diagram of an example system in accordance with embodiments.

Referring to FIG. 1, there is shown an example of a system 1000. In this example, the system 1000 comprises a UAV 100, an operator 200 and control equipment 300. In general, the system 1000 may comprise at least one UAV 100, at least one operator 200 and at least one control equipment 300. The system 1000 may contain more, fewer and/or different elements in other examples. For example, the system 1000 may not comprise the control equipment 300. This may be the case where, for example, the operator 200 can cause the UAV 100 to operate in a particular way without involving the control equipment 300. For instance, the UAV 100 may recognise a gesture made by the operator 200 and may interpret the gesture as a control command. For example, the operator 200 may make a beckoning gesture which the UAV 100 may recognise and interpret as a command to fly closer to the operator 200, the operator 200 may make a back-off gesture which the UAV 100 may recognise and interpret as a command to fly further away from the operator 200, the operator 200 may point to their eye which the UAV 100 may recognise and interpret as a command to attempt to maintain a visual line of sight with the operator 200 etc.

Item 1001 in FIG. 1 indicates that the operator 200 causes the UAV 100 to operate in a particular way, that the operator 200 can see the UAV 100 and/or that the UAV 100 can see the operator 200. Item 1002 in FIG. 1 indicates that the operator 200 can use the control equipment 300 to control the UAV 100. The operator 200 may receive feedback in relation to the UAV 100 via the control equipment 300. For example, the operator 200 may receive one or more alerts relating to the UAV 100 via the control equipment 300. Item 1003 in FIG. 1 indicates that the UAV 100 can be controlled by the control equipment 300. The control equipment 300 may transmit commands to the UAV 100 to control operation of the UAV 100. The control equipment 300 may receive data from the UAV 100. For example, the control equipment 300 may receive alerts, telemetry data etc from the UAV 100.

The UAV 100 may be in the form of a rotorcraft (or 'rotary-wing aircraft'). An example of a rotorcraft is a multicopter (or 'multirotor'). A multicopter is a rotorcraft that has more than two rotors, a rotor being a vertically oriented propeller. The multicopter is lifted and propelled by its rotors. Examples of multicopters include, but are not limited to, tricopters, quadcopters, hexacopters and octocopters, which have three, four, six and eight rotors respectively. Quadcopters are also known as 'quadrotor helicopters' or 'quadrotors'. The 100 UAV may be in another form. For example, the UAV 100 may be fixed-wing, hybrid etc. A hybrid UAV may comprise both wings and one or more rotors.

The UAV 100 is caused to operate by an operator 200. The operator 200 may be a human operator. However, the operator 200 may be non-human. An example of a non-human operator is an automated flight control system. The automated flight control system may cause the UAV 100 to operate in a manner that mimics human operation of the UAV 100. The automated flight control system may use artificial intelligence (AI) to mimic human operation. An operator 200 may also be known as a Remote Pilot (RP).

As indicated by the dashed box 1004 in FIG. 1, the operator 200 and control equipment 300 may be separate logical entities but may be embodied together in the form of one or more physical entities. For example, where the operator 200 is an automated flight control system, the automated flight control system may be embodied with the control equipment 300 such that the automated flight control system can make control decisions and use the control equipment 300 to control the UAV 100 based on the control decisions. The operator 200 and control equipment 300 may be provided in one or more equipment housings and may be implemented as a distributed system in some examples. For example, the automated flight control system may comprise a camera to enable visual contact with the UAV 100 to be maintained and may cause the UAV 100 to operate via the control equipment 300 based on data captured by the camera.

The operator 200 is an entity (human or non-human) that causes the UAV 100 to operate in a particular way. There are various different types of operator 200 and various different ways in which the operator 200 may cause the UAV 100 to operate. The degree of involvement of the operator 200 in operating the UAV 100 can vary widely. For example, the operator 200 may have a high degree of active involvement in operating the UAV 100, or the operator 200 may have very limited, or even no, active involvement in operating the UAV 100 where the operator 200 passively causes the UAV 100 to operate. The operator 200 may cause the UAV 100 to operate passively in accordance with actions performed by the operator 200, for example. For instance, the operator 200 may cause the UAV 100 to operate so as to track the operator 200 as the operator 200 moves.

In some examples, the operator 200 is relatively actively involved in causing the UAV 100 to operate. For example, the operator 200 may operate the UAV 100 in real-time while the UAV 100 is in flight. Such operation may, for example, comprise controlling a direction of travel of the UAV 100, altitude of the UAV 100, etc. The operator 200 may control the UAV 100 in this manner using the control equipment 300 or otherwise. This may be the case where, for example, the UAV 100 does not comprise any autonomous functionality such that the operator 200 remains in control of the UAV 100 at all times. Even where the UAV 100 comprises autonomous functionality, the operator 200 may still choose to have full control over the UAV 100, at one or more times.

In some examples, the operator 200 has relatively limited active involvement in operating the UAV 100. For example, the operator 200 may instruct UAV 100 to operate in a particular way, and the UAV 100 may follow the instruction of the operator 200, without the operator 200 controlling the UAV 100 in real-time while the UAV 100 is in flight. The operator may issue such an instruction while the UAV 100 is in flight, or while the UAV 100 is grounded. For example, the operator 200 may instruct the UAV 100 to perform a given operation while the UAV 100 is grounded, before the UAV 100 is in-flight, and the UAV 100 may perform that given operation in a hands-free manner, from the perspective of the operator 200. For example, the operator 200 may instruct the UAV 100 to a maintain visual line of sight with the operator 200 and the UAV 100 may perform the instruction autonomously.

In some examples, the operator 200 passively operates the UAV 100. In such examples, the operator 200 causes the UAV 100 to operate in a particular way. For example, the UAV 100 may autonomously identify a given human and operate based one or more actions taken by the human. The operator 200 may be unaware that they are causing the UAV 100 to operate in a particular way.

The control equipment 300 may take various different forms.

In some examples, the control equipment 300 is dedicated equipment arranged to control the UAV 100. In some examples, the control equipment 300 comprises dedicated remote control (RC) equipment arranged to control operation of the UAV 100. The RC equipment may comprise a handset, a headset etc. The headset may provide first-person view (FPV) functionality.

In some examples, the control equipment 300 is not dedicated equipment to control the UAV 100. For example, the control equipment 300 may be multipurpose equipment. Examples of multipurpose equipment include, but are not limited to, smartphones, tablet computing device, laptops, wearables etc. Such equipment may be arranged to control operation of the UAV 100 in addition to performing one or more additional operations. Examples of such additional operations include, but are not limited to, making telephone calls, sending e-mails, web-browsing, playing games, etc. Such equipment may natively have functionality to control operation of the UAV 100. Such equipment may not natively have such functionality, but may be provided with such functionality in another manner. For example, application software (also referred to as an "app") may be downloaded onto such equipment to enable such equipment to have the functionality to control operation of the UAV 100.

Figure 2:
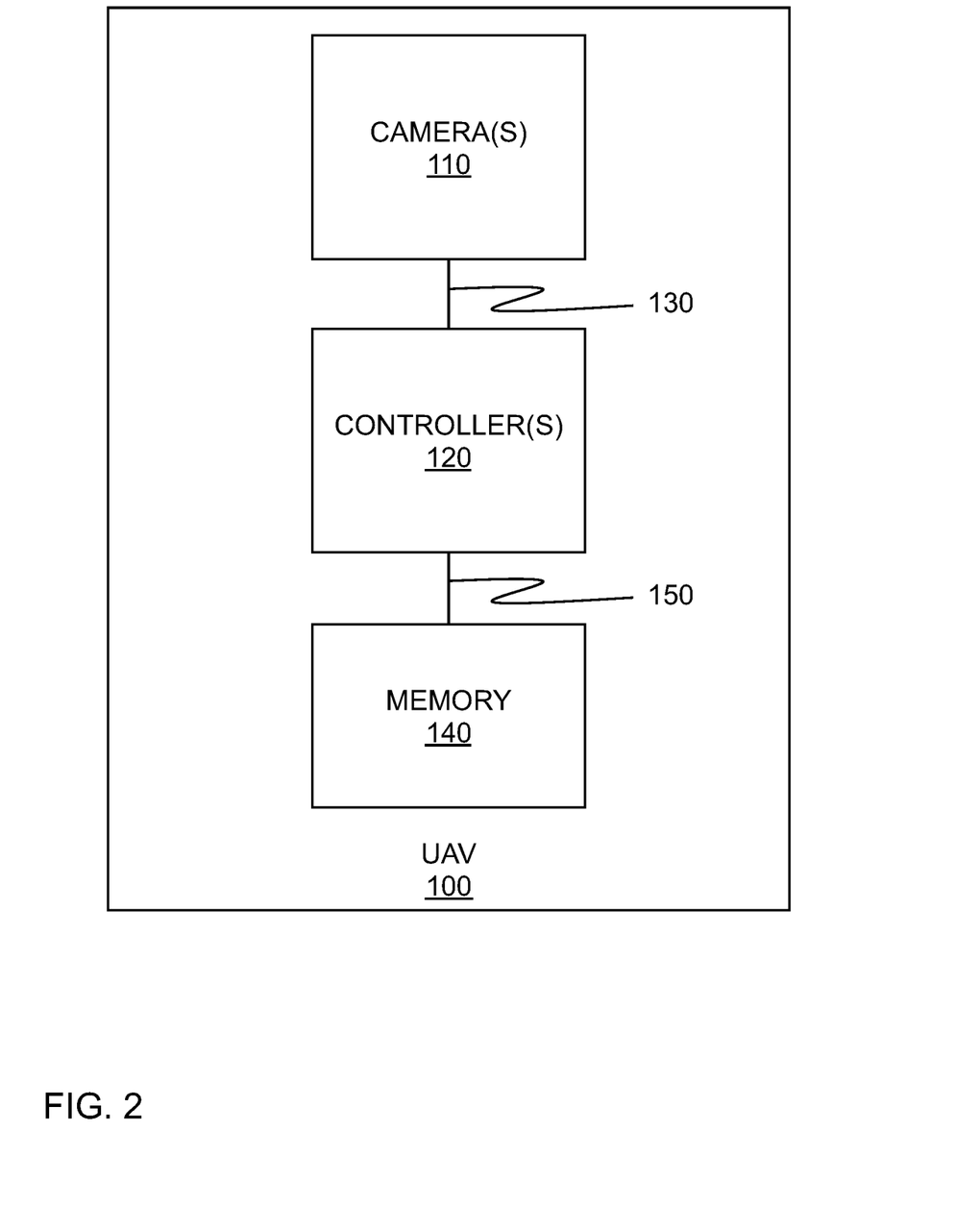
FIG. 2 shows a block diagram of an example UAV in accordance with embodiments.

Referring to FIG. 2, there is shown an example of a UAV 100.

In this example, the UAV 100 comprises a camera 110. The UAV 100 may comprise more than one camera 110. The camera may capture visible light and/or infrared. The camera 110 is configured to output image data. The output image data represents a scene within the field of view of the camera 110. The scene may comprise one or more objects. Examples of such objects include, but are not limited to, people, vehicles, trees, buildings, pets, landmarks, etc. The output image data may comprise still image data and/or video data.

In this example, the UAV 100 also comprises a controller 120. The UAV 100 may comprise more than one controller 120. The controller 120 may comprise one or more components. In this example, the controller 120 is communicatively coupled to the camera 110 via coupling 130.

The controller 120 is configured to receive image data from the camera 110. The controller 120 may receive the image data directly from the camera 110. The controller 120 may receive the image data indirectly from the camera 110 via one or more intermediate elements. An example of an intermediate element is an image processing element.

The controller 120 is configured to determine, based on the received image data, whether or not one or more predetermined visibility conditions associated with the operator 200 of the UAV 100 is satisfied. The controller 120 may analyse the received image data to determine whether or not a predetermined visibility condition is satisfied. The controller 120 may, however, be configured to determine whether or not a predetermined visibility condition is satisfied in another way.

A predetermined visibility condition may correspond to the operator 200 being able to see the UAV 100. The controller 120 may therefore determine, based on the received image data, whether or not the operator 200 can see the UAV 100.

Mere visibility of the operator 200 may, however, not be sufficient to determine that the operator 200 can see the UAV 100, for example where UAV 100 has a powerful camera 110 that has a greater range than that of the human eye. As such, the controller 120 may analyse the received image data based on a visual acuity associated with a human eye and determine whether not the operator 200 is visible on that basis. If the operator 200 is visible on that basis, then it may be determined that the operator 200 can see the UAV 100. However, in some instances, the UAV 100 may be able to see the operator 200, but the operator 200 may not be able to see the UAV 100. This may be the case where, for example, the UAV 100 can only see the back of the operator 200. References herein to the UAV 100 being able to 'see' the operator 200 may be understood to mean that the image data captured by the UAV 100 represents the operator 200.

As indicated above, the controller 120 may analyse the received image data based on a visual acuity associated with a human eye. The UAV 100 may be configured with data indicative of one or more predetermined levels of visual acuity. As such, the UAV 100 may be made compatible with different human eyes having different levels of visual acuity. A predetermined level of visual acuity may correspond to a level of visual acuity of an eye of a human operator of the UAV 100. The UAV 100 may be configured with data indicative of a plurality of different predetermined level of visual acuity associated with a given human operator of the UAV 100. This can account for differences between visual acuity levels of different eyes of a given human operator. For example, a human operator may have better vision in one eye than another. The UAV 100 may obtain the data indicative of one or more predetermined levels of visual acuity in various different ways. For example, the operator 200 of the UAV 100 may indicate one or more predetermined levels of visual acuity associated with the operator 200 to the UAV 100. For example, the operator 200 may input one or more numerical Dioptre values associated with a prescription for corrective glasses of the operator 200, which may be indicative of corresponding visual acuity values.

A predetermined visibility condition may therefore relate to visibility of the operator 200 in the received image data. The visibility condition may relate to whether or not (or an extent to which) the operator 200 is visible in the received image data. The visibility of the operator 200 in the received image data may be indicative of whether or not (or an extent to which) the operator 200 can see the UAV 100. For example, if only the back of the operator 200 is visible in the received image data, the UAV 100 may determine that the operator 200 is visible but that the operator 200 cannot see the UAV 100. If, however, the full face of the operator 200 is visible in the received image data, the UAV 100 may determine that the operator 200 is visible and that the operator can see the UAV 100.

A predetermined visibility condition may relate to visibility of one or more predetermined features of the operator 200 in the received image data. The visibility condition may relate to whether or not (or an extent to which) one or more predetermined features of the operator 200 are visible in relation to the received image data. The visibility of a predetermined feature of the operator 200 in the received image data may be indicative of whether or not (or an extent to which) the operator 200 can see the UAV 100. The one or more predetermined features may depend on the nature of the operator 200. For example, the one or more predetermined features of a human operator may be different from one or more predetermined features of a non-human operator. The UAV 100 may be configured to recognise predetermined features of the operator 200 in various different ways. For example, the UAV 100 may be configured with an artificial neural network (ANN) which has been trained with images of different predetermined features. The UAV 100 may store reference data associated with one or more operators 200 of the UAV 100. For example, a human operator may provide the UAV 100 with reference data representing the face of the human operator to facilitate recognition thereof by the UAV 100. The UAV 100 may be provided with the reference data in various different ways. For example, the UAV 100 may download the reference data from a data storage device that is physically connected to the UAV 100, may receive the reference data wirelessly, may download the reference data from cloud-based data storage, may obtain the reference data itself for example by using the camera 110 of the UAV 100 etc. The UAV 100 may, however, recognise predetermined features in other ways.

A predetermined feature of the operator 200 may comprise a face of the operator 200. The visibility of the face of the operator 200 in relation to the received image data may be indicative of whether or not (or an extent to which) the operator 200 can see the UAV 100. For example, if the full face of the operator 200 is visible in the received image data, it may be assumed that the operator 200 can see the UAV 100.

A predetermined feature of the operator 200 may comprise an eyeball of the operator 200. The visibility of the eyeball of the operator 200 in relation to the received image data may be indicative of whether or not (or an extent to which) the operator 200 can see the UAV 100. For example, if neither eyeball of the operator 200 is visible in the received image data, it may be assumed that the operator 200 cannot see the UAV 100.

The predetermined feature of the operator 200 may comprise an eye of the operator 200. The visibility of the eye of the operator 200 in the received image data may be indicative of whether or not (or an extent to which) the operator 200 can see the UAV 100. For example, if neither eye of the operator 200 is visible in relation to the received image data, it may be assumed that the operator 200 cannot see the UAV 100. However, is it possible that an eye of the operator 200 is visible, but is closed, in which case the UAV 100 would be see the eyelid of the operator 200 and the operator 200 would not be able to see the UAV 100.

The predetermined feature of the operator 200 may comprise eyewear of the operator 200. The visibility of the eyewear of the operator 200 in the received image data may be indicative of whether or not (or an extent to which) the operator 200 can see the UAV 100. For example, if eyewear of the operator 200 is visible in relation to the received image data, it may be assumed that the operator 200 may be able to see the UAV 100. If, for example, spectacles (a type of eyewear) of the operator 200 are visible in relation to the received image data, then it may be assumed that the operator 200 can see the UAV 100. If, for example, sunglasses (another type of eyewear) of the operator 200 are visible in relation to the received image data, then it may be assumed that the operator 200 can see the UAV 100 even if an eye and/or eyeball of the operator 200 cannot be seen. Alternatively, it may not be sufficient for sunglasses to be visible in relation to the received image data as both eyes of the operator 200 could be closed behind the sunglasses.

The controller 120 is configured to perform one or more predetermined actions to attempt to operate in accordance with a predetermined visibility state with respect to the operator of the UAV based on a result of the determination performed by the controller 120. Performing such a predetermined action may not, in fact, result in the UAV 100 operating accordance with the predetermined visibility state. Nevertheless, the UAV 100 may attempt to operate in accordance with the predetermined visibility state.

The predetermined visibility state may comprise a target separation state. The target separation state may correspond to a target separation between the UAV 100 and the operator 200. The target separation may correspond to one or more distances between the UAV 100 and the operator 200. The target separation may correspond to one or more measures of separation. Examples of such measures include, but are not limited to, minimum separation, maximum separation, average separation, increasing separation, decreasing separation, fluctuating between different separations etc. The predetermined visibility state may therefore use separation between the UAV 100 and the operator 200 as a proxy for visibility of the operator 200 by the UAV 100. For example, the predetermined visibility state may correspond to relatively high visibility when the UAV 100 is relatively close to the operator 200 and the predetermined visibility state may correspond to relatively low visibility when the UAV 100 is relatively far away from the operator 200.

The predetermined visibility state may comprise a Visual Line Of Sight (VLOS) state. Operating in accordance with the VLOS state may involve the operator 200 being able to maintain direct, unaided (other than corrective lenses) visual contact with the UAV 100. Such visual contact may be sufficient to monitor the flight path of the UAV 100 in relation to other UAVs, aircraft people, vessels, vehicles and/or structures, for example to avoid collisions. The VLOS state may be associated with the operator 200 being at most a predetermined distance from the UAV 100. As such, the VLOS state may correspond to target separation state, where the measure of separation corresponds to a maximum separation between the UAV 100 and the operator 200. The predetermined distance may be in accordance with regulation. The regulation may correspond to regulation in a territory in which the UAV 100 is being operated. For example, where the UAV 100 operates in the United Kingdom, the predetermined distance may correspond to a horizontal distance of 500 m and/or the predetermined distance may correspond to a vertical distance of 400 ft. Operations at a greater horizontal and/or vertical distance may be allowed in some cases (for example for relatively large UAVs), for example as indicated by a regulatory body. Operations at a smaller horizontal and/or vertical distance may be involved in some cases (for example for relatively smaller UAVs), for example as indicated by a regulatory body.

The predetermined visibility state may comprise a safe-distance state. Operating in accordance with the safe-distance state may involve the UAV 100 maintaining at least a minimum separation from the operator 200. As such, the safe-distance state may be associated with the operator 200 being at least a predetermined distance from the UAV 100. For example, the safe-distance state may correspond to a minimum straight-line distance of 5 metres between the UAV 100 and the operator 200. As such, the safe-distance state may correspond to a target separation state, where the measure of separation corresponds to a minimum separation between the UAV 100 and the operator 200.

The UAV 100 may operate in accordance with the VLOS state and the safe-distance state in parallel. In such examples, the UAV 100 may attempt to remain within eyeshot of the operator 200 of the UAV 100 while not flying too close to the operator 200 to endanger the operator of the UAV 100.

The predetermined visibility state may comprise a fixed-distance state. Operating in accordance with the fixed-distance state may involve the UAV 100 maintaining a fixed separation from the operator 200. Fixed separation may serve as a proxy for fixed visibility. In practice, the UAV 100 may not maintain an exactly fixed separation from the operator 200 in relation to the fixed-distance state. For example, the UAV 100 may be affected by wind, the operator 200 may move unexpectedly etc. However, the UAV 100 may nevertheless attempt to maintain the fixed-distance state. The fixed-distance state may correspond to a fixed distance above, below, in front of, behind and/or to a side of the operator 200. The fixed-distance state may correspond to a fixed distance in multiple different directions with respect to the operator 200. For example, the fixed-distance state may correspond to attempting to maintain a position on all or part of a virtual sphere around the operator 200. As such, the UAV 100 may attempt to maintain a position anywhere around the operator 200 as long as the position is on the virtual sphere, at a fixed distance from the operator 200.

The predetermined visibility state may comprise an Extended VLOS (EVLOS) state. EVLOS may be considered to correspond to the operator being able to comply with the applicable collision avoidance responsibilities, but the operator 200 may not need to maintain direct visual contact with the UAV 100. Collision avoidance may, however, still be achieved by use of an observer (for example a Remotely-Piloted Aircraft (RPA) observer) associated with the operator 200.

The UAV 100 may be configured to attempt to operate in accordance with the predetermined visibility state during at least part of a flight involving the UAV 100. For example, the UAV 100 may be configured to attempt to maintain the VLOS state with respect to the operator 200 for some or all of a flight.

The controller 120 may be configured to perform one or more predetermined actions in response to determining that the predetermined visibility condition is not satisfied.

Such a predetermined action may comprise causing an alert message to be transmitted to the operator 200. Causing the alert message to be transmitted to the operator 200 may comprise causing the alert message to be transmitted to the control equipment 300. The alert message may serve to notify the operator 200 that the predetermined visibility condition is not satisfied. The alert may comprise a visual alert, an audible alert, a haptic alert etc.

Such a predetermined action may comprise causing an alert message to be transmitted to an entity other than the operator 200. The alert message may serve to notify the other entity that the predetermined visibility condition is not satisfied. The other entity may comprise a regulatory body, a law enforcement agency, another UAV etc. The alert may comprise a visual alert, an audible alert, a haptic alert etc.

Such a predetermined action may comprise controlling the UAV 100 to attempt to capture image data in which the predetermined visibility condition is satisfied. As such, the UAV 100 may attempt to take remedial action in response to determining that the predetermined visibility condition is not satisfied. For example, the UAV 100 may attempt to capture image data in which the operator 200 is visible.

Such a predetermined action may comprise controlling the UAV 100 to fly to a predetermined location. The predetermined location may correspond to a home location associated with the operator 200. The predetermined location may correspond to a current location of the operator 200.

The controller 120 may be configured to perform one or more predetermined actions in response to determining that the predetermined visibility condition is satisfied.

Such a predetermined action may comprise attempting to maintain a current visibility state.

The controller 120 may be configured to control an orientation of the camera 110 with respect to a body of the UAV 100. The orientation of the camera 110 may be controlled to be above, below, in front of, behind and/or to one or both sides of the UAV 100. For example, the controller 120 may be configured to control the orientation of the camera 110 to attempt to capture image data in relation to which the predetermined visibility condition associated with the operator 200 of the UAV 100 is satisfied. As such, the UAV 100 may be able to track the operator 200.

In this example, the UAV 100 also comprises memory 140. The UAV 100 may comprise more than one memories 140. In this example, the controller 120 is communicatively coupled to the memory 140 by coupling 150. The memory 140 may store a computer program comprising computer-readable instructions, which can be executed by the controller 120 to perform any of the techniques described herein.

Figure 3:
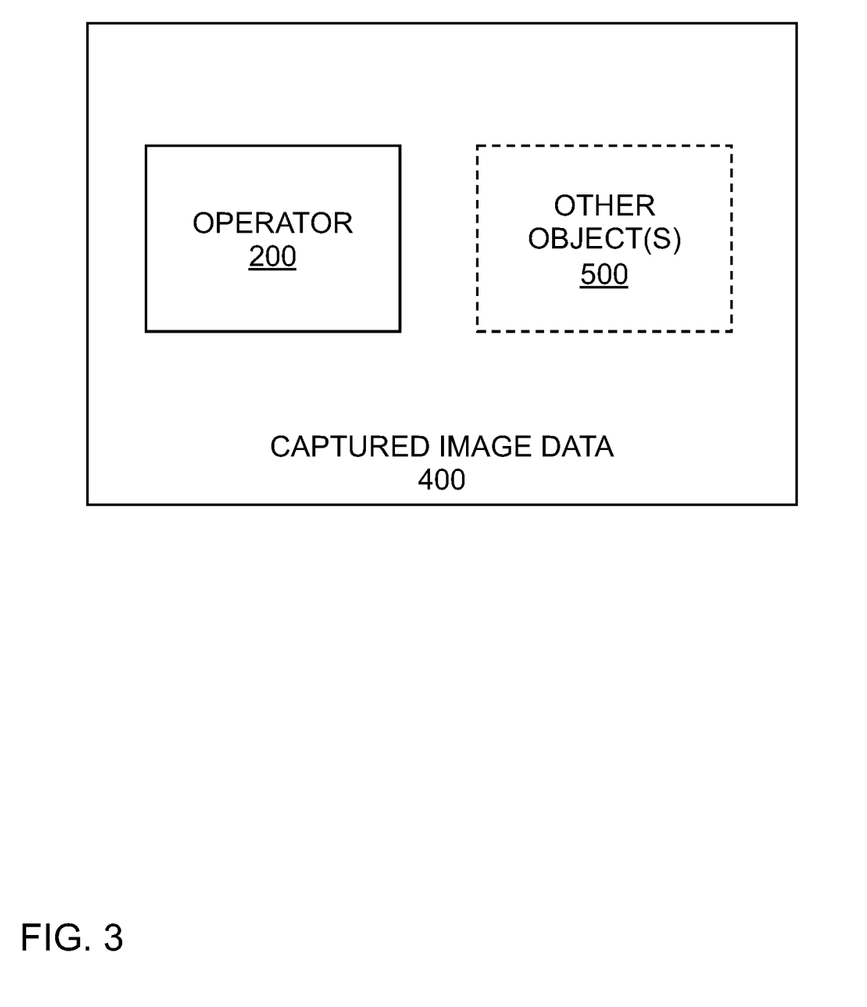
FIG. 3 shows a schematic diagram of an example of image data in accordance with embodiments.

Referring to FIG. 3, there is shown an example of image data 400.

In this example, the captured image data 400 represents the operator 200 and at least one other object 500. The captured image data 400 may represent multiple other objects 500.

In general terms, the controller 120 may be configured to distinguish its operator 200 from the at least one other object 500 in the image data 400. The at least one other object 500 may comprise a person or any other type of object. The controller 120 may be configured to distinguish between different operators where multiple operators are represented in the received image data 400. As such, the controller 120 may track the operator 200 controlling the UAV 100 where multiple operators are represented in the received image data where, for example, another operator could be operating their own UAV.

Figure 4:
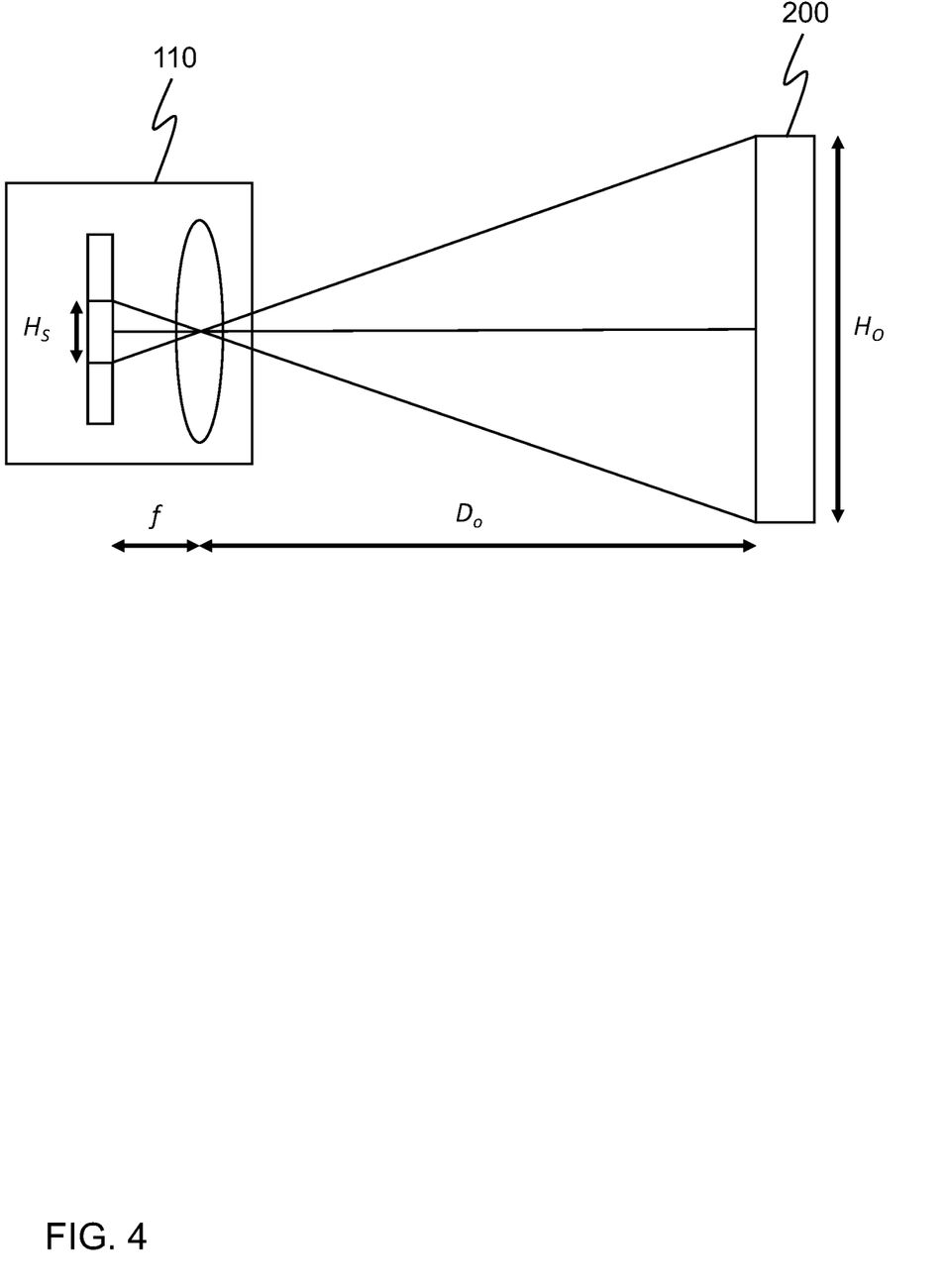
FIG. 4 shows a schematic diagram illustrating how a distance between a UAV and an operator of the UAV may be determined in accordance with embodiments.

Referring to FIG. 4, there is shown an example of how a distance between the UAV 100 and the operator 200 may be determined.

In this example, the distance between the UAV 100 and the operator 200 is determined using the image data captured by the camera 110 of the UAV 100. More specifically, in this example, the distance between the UAV 100 and the operator 200 is determined by analysing the image data captured by the camera 110 of the UAV 100 and one or more attributes of the camera 110. However, the UAV 100 may determine the distance between the UAV 100 and operator 200 in various different ways. In this specific example, the distance is determined using a similar triangles' technique.

In such an example, a distance, $D_O$, between the UAV 100 and the operator 200 may be determined using a height-based similar triangle technique based on the equation:

$$D_O = \frac{H_O \times f}{H_S}$$

where $H_O$ is the height of the operator 200, f is the focal length of the camera 110, and $H_S$ is the height of the operator 200 on the sensor of the camera 110. $D_O$ and $H_O$ can be expressed using the same measurement units as each other. For example, $D_O$ and $H_O$ may be expressed in feet or metres. f and $H_S$ can be expressed using the same measurement units as each other. For example, f and $H_S$ can be expressed in millimetres. The UAV 100 can obtain $H_O$ in various different ways. $H_O$ may be considered to be the 'actual' or 'real-world' height of the operator 200. The more accurate the value of $H_O$, the more accurate the value of $D_O$ is likely to be. However, an estimate of $H_O$ can be used in some examples. The operator 200 may indicate $H_O$ to the UAV 100. The UAV 100 may be able to determine $H_O$ during a calibration phase. For example, the UAV 100 may be able to determine $H_O$ during a calibration phase using the equation:

$$H_O = \frac{D_O \times H_S}{f}$$

where, for example, $D_O$, $H_S$, and f are all known to the UAV 100. For example, the UAV 100 may be arranged a set distance away from the operator 200. For example, the UAV 100 may be placed at a distance of 10 metres from the operator 200. Such distance may be determined using a tape measure, or in another manner. The UAV 100 can obtain f from a known focal length of the camera 110 used to capture given image data, or in another manner. The focal length may be recorded in metadata associated with captured image data. For example, the focal length may be recorded in Exchangeable image file format (Exif) data. The UAV 100 can obtain $H_S$ in various different ways. For example, the UAV 100 may determine $H_S$ in pixels in captured image data and use a corresponding height-per-pixel value to determine the height of the operator 200 on the sensor. The UAV 100 may identify the operator 200 in the captured image data and determine the number of vertical pixels in the captured image data corresponding to the operator 200. The UAV 100 may determine the height-per-pixel value by dividing the height of the sensor of the camera 110 by the number of pixels (vertically) of the sensor.

Alternatively or additionally, a distance, $D_O$, between the UAV 100 and the operator 200 may be determined using width-based similar triangles using the equation:

$$D_O = \frac{W_O \times f}{W_S}$$

where $W_O$ is the width of the operator 200, f is the focal length of the camera 110, and $W_S$ is the width of the operator 200 on the sensor of the camera 110. $D_O$ and $W_O$ can be expressed using the same measurement units as each other. f and $W_S$ can be expressed using the same measurement units as each other.

The distance between the UAV 100 and the operator 200 may be determined using multiple different techniques. For example, the distance between the UAV 100 and the operator may be determined using both height-based similar triangles and width-based similar triangles techniques. For example, the distance between the UAV 100 and the operator may be determined as a function of the distances determined using both the height-based similar triangles and width-based similar triangles techniques. The function may be the average.

In some examples, the camera 110 outputs data indicating the distance between the UAV 100 and an object in focus in captured image data. For example, Exif data may indicate such a distance. In some cases, an indication of distance in Exif data may have a relatively low degree of accuracy. In some examples, even a relatively low degree of accuracy may be sufficient.

The distance between the UAV 100 and the operator 200 can be determined in other ways. For example, where the position of the UAV 100 and the operator 200 (and/or the control equipment 300) are known, the distance between them may be determined. The positions may be known through geolocation functionality, or otherwise. Geolocation functionality may comprise Global Positioning System (GPS) functionality. The distance between the UAV 100 and the control equipment 300 may be determined based on received signal strength, for example.

Figure 5:
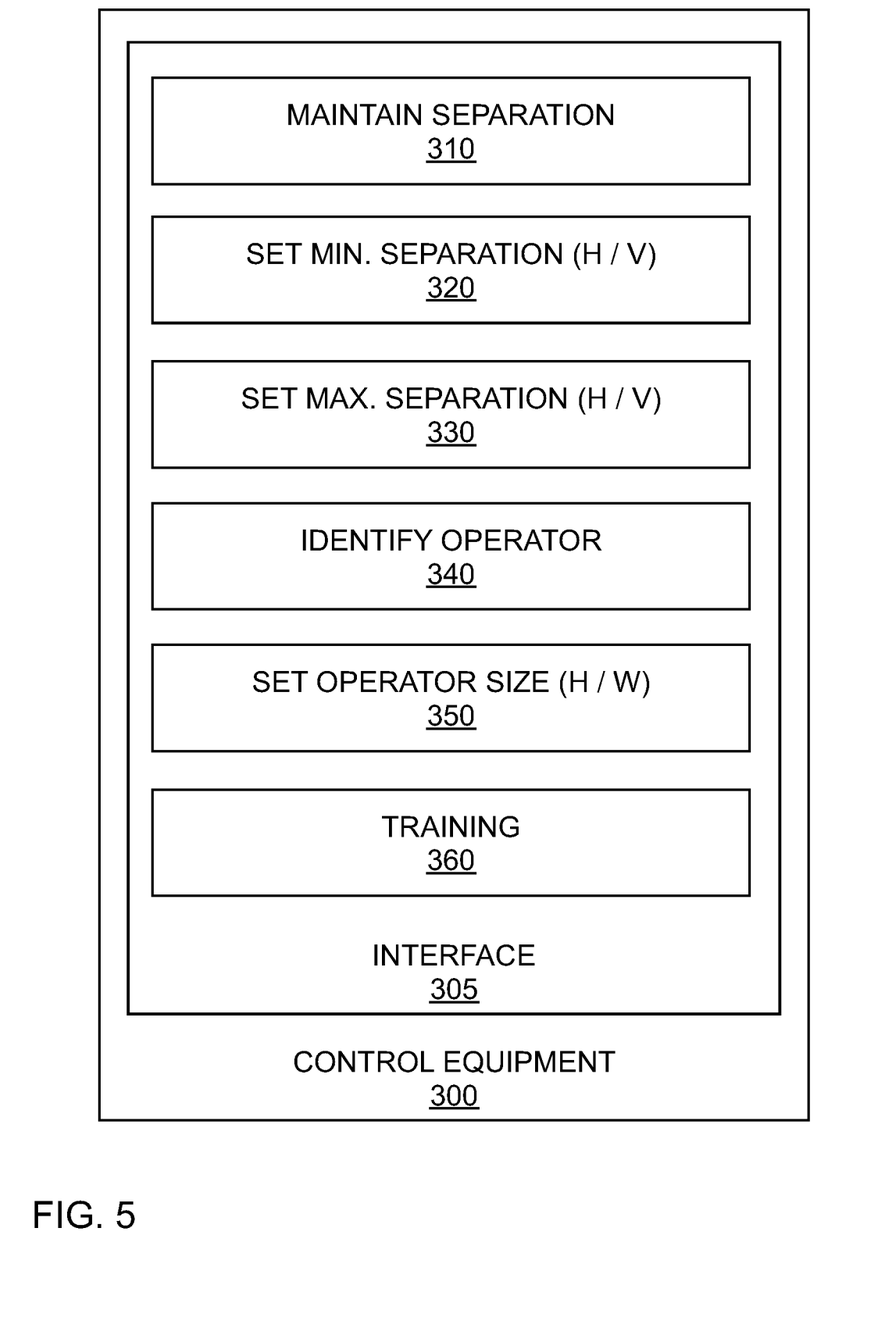
FIG. 5 shows a schematic diagram of an example interface of example control equipment in accordance with embodiments.

Referring to FIG. 5, there is shown an example interface 305 of example control equipment 300.

The interface 305 may comprise a touch-screen interface, or otherwise.

In this example, the interface 305 indicates various control options to control operation of the UAV 100.

In this example, the interface 305 indicates a 'maintain separation' option 310, which enables the operator 200 to indicate that a target separation should be maintained between the UAV 100 and the operator 200.

In this example, the interface 305 indicates a 'set min. separation (h/v)' option 320, which enables the operator 200 to set a minimum separation distance between the UAV 100 and the operator 200. In this specific example, the operator 200 can specify horizontal ('h') and/or vertical ('v') components. However, the operator 200 may be able to specify the separation in a different manner, for example as a straight-line distance. The operator 200 may be able to change measurement units.

In this example, the interface 305 indicates a 'set max. separation (h/v)' option 330, which enables the operator 200 to set a maximum separation distance between the UAV 100 and the operator 200. In this specific example, the operator 200 can specify horizontal ('h') and/or vertical ('v') components. However, the operator 200 may be able to specify the separation in a different manner, for example as a straight-line distance. The operator 200 may be able to change measurement units.

In this example, the interface 305 indicates an 'identify operator' option 340, which enables the operator 200 to identify themselves to the UAV 100. This may facilitate identification of the operator 200 by the UAV 100. The operator 200 may be able to identify themselves in various different ways. For example, the UAV 100 may relay image data to the control equipment 300. Such image data may comprise still image data and/or video data. The operator 200 may see themselves in the relayed image data. The operator 200 may, for example, touch a region of the interface 305 corresponding to the representation of the operator 200 to identify themselves to the UAV 100.

In this example, the interface 305 indicates an 'set operator size (h/w)' option 350, which enables the UAV 100 to determine the height and/or width of the operator 200. For example, this may enable the UAV 100 to determine $H_O$ and/or $W_O$ described above.

In this example, the interface 305 indicates a 'training' option 360, via which a human operator can be trained to control the UAV 100. As such, the UAV 100 may perform the techniques described herein as part of a training programme where a human operator is being trained to control the UAV 100. The UAV 100 can provide reliable feedback if the predetermined visibility condition is not satisfied. As such, the human operator can reliably and accurately learn when the predetermined visibility condition is not satisfied based on feedback from the UAV 100.

The UAV 100 may store a database identifying one or more predetermined visibility conditions and/or one or more predetermined visibility states. The predetermined visibility condition(s) and/or predetermined visibility state(s) may be associated with one or more locations, one or more weather conditions, one or more lighting conditions, one or more human operator experience levels, etc. The database may, for example, indicate that a first given predetermined visibility condition and/or a first given predetermined visibility state is associated with foggy weather conditions. Where foggy weather conditions are present, the first given predetermined visibility condition and/or the first given predetermined visibility state may be used. The database may, for example, indicate that a second given predetermined visibility condition and/or a second given predetermined visibility state is associated with flights in a first geographic location and that a third given predetermined visibility condition and/or a third given predetermined visibility state is associated with flights in a second geographic location. Where the UAV 100 flies in, for example, the second geographic location, third given predetermined visibility condition and/or the third given predetermined visibility state may be used. As such, the UAV 100 provides enhanced customisability, for use in different flight scenarios.

In some examples, the camera 110 comprises a forward-facing, sideways-facing and/or backwards facing camera. Such cameras may be especially effective in performing the techniques described herein as they are generally more likely to have a field of view including the operator than an upwards-facing or downwards-facing camera. A backwards-facing camera is particularly effective since an operator is generally likely to be flying the UAV 100 away from themselves when likely to have a field of view including the operator in the scenarios described herein as the operator will generally be flying the UAV 100 away from themselves on the threshold of the predetermined visibility condition associated with the operator being satisfied or not being satisfied. As such, forward-facing, sideways-facing and/or backwards facing cameras, and in particular backwards-facing cameras, may provide more reliable performance of the techniques described herein than an upwards-facing or downwards-facing camera. However, the camera may comprise one or more of a forward-facing camera, a sideways-facing camera, a backwards-facing camera, an upwards-facing camera and a downwards-facing camera. A given camera may be able to face in multiple different directions, for example where the given camera is mounted on a gimbal.

Some examples described above involve determining, based on image data received from the camera 110 of the UAV 100, whether or not a predetermined visibility condition associated with the operator 200 of the UAV 100 is satisfied and performing a predetermined action to attempt to operate in accordance with a predetermined visibility state with respect to the operator 200 of the UAV 100 based on a result of the determination. More generally, measures (for example UAVs, methods, controllers and computer programs) are provided herein which involve determining, based on received image data, whether or not a predetermined visibility condition associated with one or more reference objects is satisfied and performing a predetermined action to attempt to operate in accordance with a predetermined visibility state with respect to the one or more reference objects based on a result of the determination. The one or more reference objects may comprise the operator 200 of the UAV 100. Other example reference objects include, but are not limited to, a person who is not an operator of the UAV 100, an animal, a vehicle, etc.

Some examples described above involve determining, based on image data received from the camera 110 of the UAV 100, whether or not a predetermined visibility condition associated with the operator 200 of the UAV 100 is satisfied and performing a predetermined action to attempt to operate in accordance with a predetermined visibility state with respect to the operator 200 of the UAV 100 based on a result of the determination. More generally, measures (for example UAVs, methods, controllers and computer programs) are provided herein which involve determining, based data obtained by the UAV 100, whether or not a predetermined visibility condition associated with the operator 200 of the UAV 100 is satisfied and performing a predetermined action to attempt to operate in accordance with a predetermined visibility state with respect to the operator 200 of the UAV 100 based on a result of the determination. The data obtained by the UAV 100 may comprise image data captured by the UAV 100. However, the data obtained by the UAV 100 may comprise other types of data. Examples of other types of data include, but are not limited to, geolocation data and signal strength data. As such, the UAV 100 may determine a distance between the UAV 100 and the operator 200 of the UAV 100 and use this as a proxy to determine whether or not the predetermined visibility condition is met. For example, the UAV 100 may determine that the separation between the UAV 100 and the operator 200 is such that the operator 200 would not be able to see the UAV 100.

Measures (for example UAVs, methods, controllers and computer programs) are also provided herein in which a UAV comprises a controller configured to: (a) determine, based on data obtained by the UAV, whether or not a predetermined visibility condition associated with one or more reference objects is satisfied, and (b) perform a predetermined action to attempt to operate in accordance with a predetermined visibility state with respect to the one or more reference objects based on a result of the determination.

Some examples described above involve use of the techniques described herein to avoid collision of the UAV 100 with one or more other objects. However, the techniques described herein may be used with one or more different objectives in mind. For example, the techniques described herein may be used to provide a degree of personal security to the operator 200 of the UAV 100.

Various modifications and alternatives will be apparent to one skilled in the art. The following numbered clauses on pages 18 to 21 of the present description correspond to the claims of UK patent application nos. GB1714065.8 and GB1802091.7, from which the present application claims priority, as filed. The claims of the present application as filed can be found on the subsequent pages 22 to 24 of the specification which begin with the heading "CLAIMS".

1. An unmanned aerial vehicle, UAV, comprising:
   a camera; and
   a controller configured to:
   receive image data from the camera;
   determine, based on the received image data, whether or not a predetermined visibility condition associated with an operator of the UAV is satisfied; and
   perform a predetermined action to attempt to operate in accordance with a predetermined visibility state with respect to the operator of the UAV based on a result of said determination.

2. A UAV according to clause 1, wherein the predetermined visibility condition corresponds to the operator being able to see the UAV.

3. A UAV according to clause 1 or 2, wherein the predetermined visibility condition relates to visibility of the operator in the received image data.

4. A UAV according to any of clauses 1 to 3, wherein the predetermined visibility condition relates to visibility of a predetermined feature of the operator in the received image data.

5. A UAV according to clause 4, wherein the predetermined feature comprises an eyeball of the operator.

6. A UAV according to clause 4 or 5, wherein the predetermined feature comprises an eye of the operator.

7. A UAV according to any of clauses 4 to 6, wherein the predetermined feature comprises eyewear of the operator.

8. A UAV according to any of clauses 1 to 7, wherein the predetermined visibility state comprises a Visual Line Of Sight, VLOS, mode.

9. A UAV according to clause 8, wherein the VLOS mode is associated with the operator being at most a predetermined distance from the UAV.

10. A UAV according to clause 9, wherein the predetermined distance corresponds to a horizontal distance of 500 m.

11. A UAV according to clause 9 or 10, wherein the predetermined distance corresponds to a vertical distance of 400 ft.

12. A UAV according to any of clauses 1 to 11, wherein the controller is configured to perform the predetermined action in response to determining that the predetermined visibility condition is not satisfied.

13. A UAV according to clause 12, wherein performing the predetermined action comprises causing an alert message to be transmitted to the operator.

14. A UAV according to clause 12 or 13, wherein performing the predetermined action comprises causing an alert message to be transmitted to an entity other than the operator.

15. A UAV according to any of clauses 12 to 14, wherein performing the predetermined action comprises controlling the UAV to attempt to capture image data in which the predetermined visibility condition is satisfied.

16. A UAV according to any of clauses 12 to 15, wherein performing the predetermined action comprises controlling the UAV to attempt to fly to a predetermined location.

17. A UAV according to any of clauses 1 to 16, wherein the controller is configured to attempt to operate in accordance with the predetermined visibility state during at least part of a flight involving the UAV.

18. A UAV according to any of clauses 1 to 17, wherein the controller is configured to control an orientation of the camera with respect to a body of the UAV.

19. A UAV according to clause 18, wherein the controller is configured to control the orientation of the camera to attempt to capture image data in which the predetermined visibility condition associated with the operator of the UAV is satisfied.

20. A UAV according to any of clauses 1 to 19, wherein the controller is configured to distinguish between different operators where multiple operators are represented in the received image data.

21. An unmanned aerial vehicle, UAV, comprising a controller configured to determine whether or not an operator of the UAV can see the UAV.

22. An unmanned aerial vehicle, UAV, comprising a controller configured to control operation of the UAV dependent on whether or not an operator of the UAV can see the UAV.

23. An unmanned aerial vehicle, UAV, comprising a controller configured to attempt to maintain a Visual Line Of Sight, VLOS, state with respect to an operator of the UAV.

24. An unmanned aerial vehicle, UAV, comprising a controller configured to control the UAV based on whether or not an eyeball of an operator of the UAV is visible in image data captured by the UAV.

25. An unmanned aerial vehicle, UAV, comprising a controller configured to analyse image data captured by the UAV in accordance with the visual acuity of a human eye.

26. A method of controlling an unmanned aerial vehicle, UAV, the method comprising:

determining, based on image data captured by the UAV, whether or not a predetermined visibility condition associated with an operator of the UAV is satisfied; and performing a predetermined action to attempt to operate in accordance with a predetermined visibility state with respect to the operator of the UAV based on a result of said determination.

27. A computer program comprising instructions which, when executed, cause a method of controlling an unmanned aerial vehicle, UAV, to be performed, the method comprising:

determining, based on image data captured by the UAV, whether or not a predetermined visibility condition associated with an operator of the UAV is satisfied; and performing a predetermined action to attempt to operate in accordance with a predetermined visibility state with respect to the operator of the UAV based on a result of said determination.

What is claimed is:

1. An unmanned aerial vehicle (UAV) comprising:
one or more cameras, the one or more cameras configured to capture image data and output the image data, wherein the image data represents an object to be tracked; and
a controller configured to:
receive the output image data from at least one of the one or more cameras;
analyse the received output image data;
determine, from the analysis of the received output image data, if the object to be tracked satisfies a predetermined visibility condition with respect to the one or more cameras, wherein the visibility condition is a visual line of sight between the one or more cameras and the object;
attempt to maintain the predetermined visibility condition autonomously; and
cause an alert to be transmitted to and configured to be received by an operator to indicate whether the predetermined visibility condition is satisfied or is not satisfied, wherein the alert is selected from the croup consisting of a visual alert, an audible alert and a haptic alert.

2. The UAV of claim 1, wherein the object to be tracked includes at least a first and a second object to be tracked, and wherein the controller is configured to distinguish between the at least the first and the second object to be tracked represented in the received output image data.

3. The UAV according of claim 1, wherein the controller is configured to control an orientation of some or all of the one or more cameras when the one or more cameras is greater than one, the control being with respect to a body of the UAV to attempt to capture the image data in which the object to be tracked is visible.

4. The UAV of claim 1, wherein the UAV comprises a collision-avoidance mechanism.

5. The UAV of claim 1, wherein the object to be tracked comprises the operator of the UAV.

6. The UVA of claim 1, wherein the object to be tracked comprises a vehicle.

7. The UAV of claim 1, wherein the UAV is configured to recognise a gesture made by the operator of the UAV and to interpret the gesture as a control command.

8. The UAV of claim 1, wherein the UAV is a quadrotor helicopter.

9. The UAV of claim 1, wherein the one or more cameras comprise at least two upwards-facing cameras.

10. The UAV of claim 1, wherein the object to be tracked comprises an animal.

* * * * *